March 29, 1960    P. P. SAMANIEGO    2,930,862
CURB FEELER SIGNAL
Filed March 10, 1958
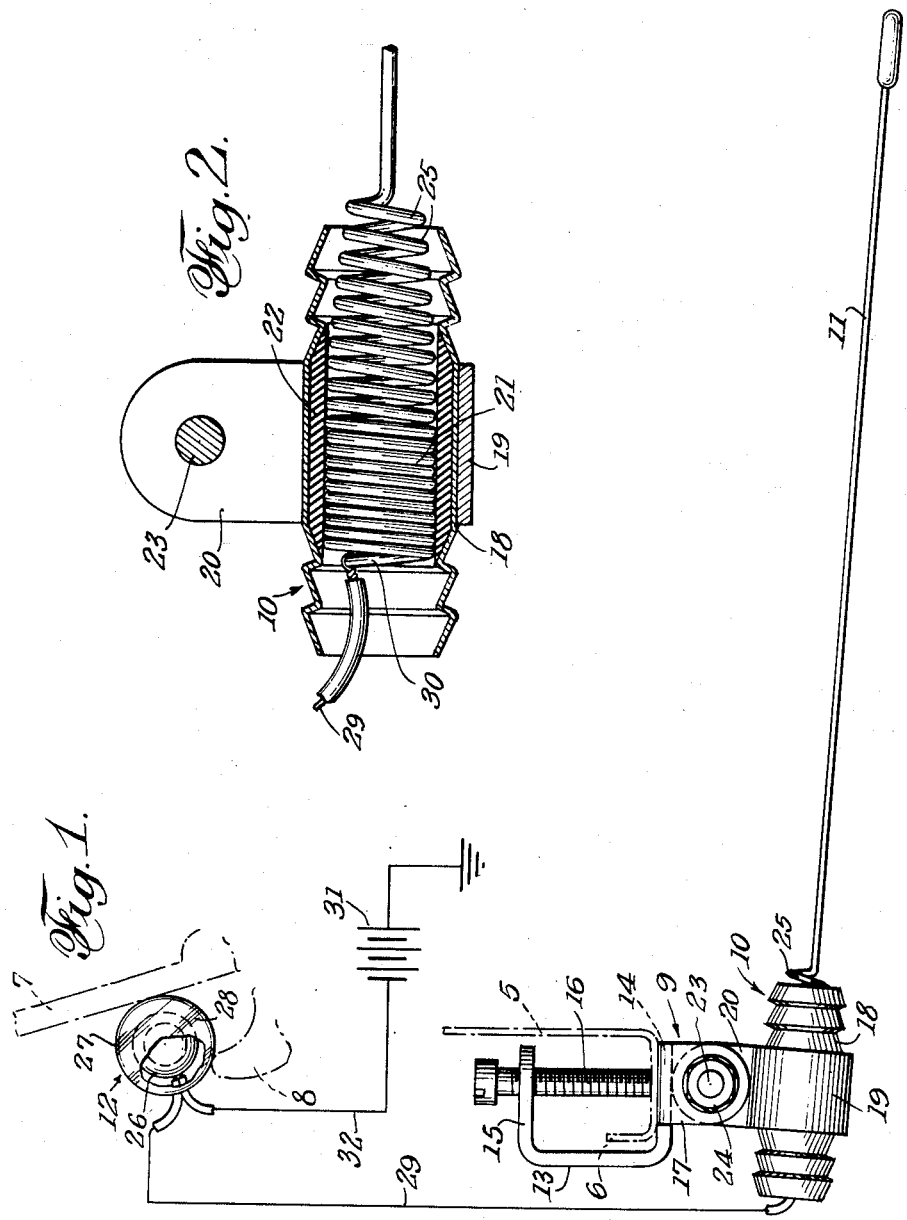
INVENTOR.
PHILLIP P. SAMANIEGO
BY C. G. Stratton
ATTORNEY United States Patent Office 2,930,862
Patented Mar. 29, 1960

2,930,862
CURB FEELER SIGNAL
Phillip P. Samaniego, Los Angeles, Calif.
Application March 10, 1958, Serial No. 720,141
8 Claims. (Cl. 200—61.44)

This invention relates to a curb feeler signal for use on automotive vehicles to apprise of the proximity of a curb, to prevent tire marring and body scrapes and damages.

An object of the present invention is to provide a feeler signal device that is of unitary form and adapted for easy and facile installation on an automotive vehicle.

Another object of the invention is to provide a curb feeler signalling device that utilizes curb deflection of a feeler to provide a visual signal, the device contemplating means that will produce such a signal under minimal deflection conditions.

A further object of the invention is to provide novel and improved means to produce an electric contact in a normally-open feeler circuit to create a signal of the character referred to.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, one embodiment of the present invention, which is given by way of illustration or example only.

In the drawing, like reference characters designate similar parts in the several views.

Fig. 1 is a systemic view of a signal of the character herein contemplated and shown as installed on an automotive vehicle.

Fig. 2 is an enlarged and fragmentary longitudinal sectional view showing the contact means of the present signal.

In Fig. 1 is shown a fender 5 of an automotive vehicle, the same being ordinarily provided with an inturned rim bead 6 for finishing and stiffening purposes. The section of fender shown is typical of both front and rear fenders, it being clear that the present curb feeler signal is adapted to be mounted on both fenders on the curb side of a vehicle. Said view also shows the windshield 7 and the upper portion 8 of the instrument panel of such a vehicle, it being contemplated that the signal component of the present device be housed in the channel formed between said windshield and panel.

The curb feeler signal that is illustrated comprises, generally, a mounting bracket 9 removably connected to the fender 5 at its rim bead 6, normally-open switch 10 adjustably carried by said bracket, a curb feeler 11 to operate said normally-open switch to close the same upon deflection by a curb or the like, a signal light 12 disposed where the same may be seen by the driver of the vehicle and preferably in the channel above mentioned, and an electric circuit interconnecting said switch 10 and light 12.

The bracket 9 comprises a rim-engaging mounting part 13, the same being C-shaped with a leg 14 engaged beneath the fender rim bead and a leg 15 spaced thereabove, a clamp screw or screws 16 carried by said leg 15 and directed to impinge the rim bead to lock the bracket in place, and an apertured ear or ears 17 extending downwardly from the leg 14 of the part 13.

The switch 10 comprises a tube of metal 18, a clamp band 19 around the girth of said tube and provided with apertured ears 20 that are superimposed with the ears 17 of the bracket, a helical coil 21 of wire axially arranged in said tube and partly protruding from an end thereof, and an insulating sleeve 22 interposed between the tube and the coil.

As shown, the outer surface of the insulating sleeve 22 conforms in shape to the inner surface of the metallic housing or tube 18. Preferably, the central supporting portion of the tube 18 is cylindrical except for ends tapering to a smaller diameter and the outer surface of the tubular insulator 22 is also cylindrical except for tapering end portions fitting within the tapers of the ends of the central supporting portion of the tube 18. Moreover, the tube 18 has extending portions beyond the central supporting portion zigzagging from an increased diameter to a smaller diameter comparable with the minimum diameter of the outer surface of the tubular insulator 22, but sufficiently greater than the outer diameter of the extending portion of the coiled wire 25 so that it is normally out of electrical contact with the edge portions formed in the inner periphery of the extending parts of the tube 18.

A pivot bolt 23 extends through the apertures of the ears 17 and 20 and, when loosened, enables angular adjustment of the tube 18 relative to the bracket 9. The adjustment may be locked by a nut 24 on the bolt 23.

In practice, the coil 21 extends beyond an edge of the insulating sleeve 22. The turns of said coil are preferably separated, as shown at 25, thereby enabling said coil to deflect from its normal axial position in tube 18 wherein said turns are spaced from the rim or lip of said tube.

Since the curb feeler 11 comprises an extension of the coil 21, it will be clear that any deflection of said feeler will cause a lesser but corresponding deflection of the open-wound end of the coil. As a consequence, the latter end will physically touch the tube rim upon deflection of the feeler by a curb or the like. Upon release of the deflecting means, the feeler will straighten out as will the coil, to restore the original spacing between the tube and the coil.

The signal light 12 may take various forms. The one shown comprises a socket-mounted light bulb 26, a tubular container 27 in which said bulb is placed and a lens 28 on the end of said container and through which the light shines when lit. As shown, the container may be placed in the channel formed by the windshield and instrument panel and a conductor 29 connects one side of said lamp bulb 26 and the end 30 of the coil that is opposite to the curb feeler.

The electric circuit includes the mentioned conductor, the battery 31 of the vehicle, and a conductor 32 connecting said battery and the other side of the lamp bulb. The circuit shown is conventional of grounded low-voltage circuits of six- and twelve-volt potential ordinarily used in automotive vehicles.

By placing the ignition switch of the vehicle in such a circuit, the signal will remain "on" only while said switch is closed. When the ignition switch is opened, the curb-feeler signal goes "off."

It will be clear that the circuit is normally open and is closed only when the switch 10 is closed, as by deflection of the curb feeler.

While the foregoing specification illustrates and describes what I now contemplate to be the best mode of carrying out my invention, the construction is, of course, subject to modification without departing from the spirit and scope of my invention. Therefore, I do not desire to restrict the invention to the particular form of construction illustrated and described, but desire to cover all modifications that may fall within the scope of the appended claims.

Having thus described my invention, what I claim and desire to secure by Letters Patent is:

1. A curb feeler signal switch comprising a curb feeler adapted to be deflected comprising an extending wire integral with a coiled portion, means mounting said feeler including a metal tube with said coiled portion disposed in the tube and normally spaced therefrom, the feeler constituting an extension of the coiled portion and the latter deflecting into electrical contact with the tube upon deflection of the feeler.

2. A curb feeler signal switch according to claim 1 in which a clamp encircles the tube and an adjustable pivot connects said clamp and mounting means.

3. A curb feeler signal switch according to claim 1 in which insulation is interposed between the tube and the coiled portion.

4. In a curb feeler signal, a tube, a coiled metal member disposed in and spaced from said tube and extending beyond one end of the tube, said coiled member being adapted to be deflected into contact with the tube to close an electric circuit between the tube and coiled member and having an extending substantially straight portion integral with the coiled portion for deflecting the coiled portion.

5. A curb feeler signal according to claim 4 in which the helical turns of the coiled member are spread to increase deflection thereof.

6. A curb feeler signal switch comprising a metallic tube with a central supporting portion with end portions of the central supporting portion tapering to a smaller diameter, and extending portions beyond the central supporting portion, a tubular insulator having an outside diameter tapering at the ends, said insulator fitting in said tube central supporting portion, and a coiled metal member secured in said insulator, spaced from said metallic tube, extending from one end thereof and adapted to be deflected against the tube to make an electrical contact.

7. A curb feeler signal switch comprising a metallic tube with a central supporting portion of varying diameter and extending portions beyond the central supporting portion, a tubular insulator having an outer surface conforming to the inner surface of the central supporting portion, and a coiled metal member secured in said insulator, spaced from said metallic tube, extending from one end thereof and adapted to be deflected against the tube to make an electrical contact.

8. A curb feeler signal switch comprising a metallic tube with a central supporting portion of varying and transverse dimensions and extending portions beyond the central supporting portion having zigzag-shaped surfaces to form a series of inner edges, a tubular insulator having an outer surface conforming in shape to the inner surface of the central supporting portion of the metallic tube, and a coiled metal member secured in said insulator spaced from said metallic tube extending from one end thereof and adapted to be deflected against one of the edge portions of the tube to make an electrical contact.

References Cited in the file of this patent

UNITED STATES PATENTS

| | | |
|---|---|---|
| 2,482,630 | Mastromarino | Sept. 20, 1949 |
| 2,592,742 | Rose | Apr. 15, 1952 |
| 2,786,910 | Tyska | Mar. 26, 1957 |